(12) United States Patent  
Rubens et al.

(10) Patent No.: US 10,201,864 B2  
(45) Date of Patent: Feb. 12, 2019

(54) GUIDE ATTACHMENT FOR A ROTARY POWER TOOL

(71) Applicants: Robert Bosch Tool Corporation, Broadview, IL (US); Robert Bosch GmbH, Stuttgart (DE)

(72) Inventors: Jeremy Rubens, Palatine, IL (US); Christopher Dvorak, Ottawa, KS (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 80 days.

(21) Appl. No.: 15/219,977

(22) Filed: Jul. 26, 2016

(65) Prior Publication Data

US 2018/0029147 A1 Feb. 1, 2018

(51) Int. Cl.  
*B23D 45/16* (2006.01)  
*B25F 5/00* (2006.01)

(52) U.S. Cl.  
CPC ............... *B23D 45/16* (2013.01); *B25F 5/00* (2013.01)

(58) Field of Classification Search  
CPC ............ B23D 45/16; B23D 59/00; B25F 5/00  
USPC .................................................... 30/390, 278  
See application file for complete search history.

(56) References Cited

U.S. PATENT DOCUMENTS

| | | | | |
|---|---|---|---|---|
| 2,367,432 A | * | 1/1945 | Reprogle | A61F 15/02 30/290 |
| 2,518,939 A | * | 8/1950 | Ross | A61F 15/02 30/370 |
| 2,898,957 A | * | 8/1959 | Demarkis | B27C 5/10 144/136.1 |
| 4,114,266 A | * | 9/1978 | Erpenbeck | B26B 27/00 30/123 |
| 4,993,243 A | * | 2/1991 | Guinn | B23Q 11/06 30/390 |
| 5,974,674 A | * | 11/1999 | Kelly | B27B 5/08 144/136.95 |
| 6,154,963 A | * | 12/2000 | Kooiman | B23D 51/025 30/289 |
| 6,389,701 B1 | * | 5/2002 | Friedland | B26B 29/02 144/251.3 |
| 6,561,063 B1 | * | 5/2003 | Mulford | B24B 55/052 30/390 |

(Continued)

FOREIGN PATENT DOCUMENTS

DE 112013006573 T5 12/2015

OTHER PUBLICATIONS

International Search Report corresponding to PCT Application No. PCT/EP2017/068566 (4 pages).

*Primary Examiner* — Hwei C Payer  
(74) *Attorney, Agent, or Firm* — Maginot Moore & Beck LLP (57) ABSTRACT

A guide attachment for a rotary power tool includes a body and an outer guard. The body defines a central opening configured to receive a shank of the rotary power tool, and the central opening defines a central axis. The outer guard extends circumferentially around at least a portion of the body, and the outer guard and the body define a disk receiving recess adapted to receive at least a portion of a cutting disk of the rotary power tool. The outer guard further defines a first aperture that extends through the outer guard in a first direction that is generally orthogonal to the central axis.

20 Claims, 7 Drawing Sheets

(56) References Cited

U.S. PATENT DOCUMENTS

| | | | | |
|---|---|---|---|---|
| 6,735,875 | B1* | 5/2004 | Eslambolchi | B23D 45/122 30/377 |
| 6,925,917 | B2* | 8/2005 | Tilley | B23D 45/003 30/123.3 |
| 7,047,650 | B2* | 5/2006 | Chen | B27B 5/08 30/373 |
| 7,310,879 | B1 | 12/2007 | Clarke et al. | |
| 8,181,350 | B1* | 5/2012 | Morin | B23D 45/12 30/101 |
| 9,009,982 | B1* | 4/2015 | Sedgwick | B23D 59/006 30/388 |
| 9,089,941 | B2* | 7/2015 | Moreno | B27G 19/04 |
| 2010/0170538 | A1 | 7/2010 | Baker et al. | |
| 2012/0042524 | A1* | 2/2012 | Deeter | A61F 5/05 30/278 |
| 2018/0029147 | A1* | 2/2018 | Rubens | B23D 45/16 |

* cited by examiner

GUIDE ATTACHMENT FOR A ROTARY POWER TOOL

TECHNICAL FIELD

This disclosure relates generally to power tools, and more particularly to guide attachments for rotary power tools.

BACKGROUND

In general, rotary power tools are light-weight, handheld power tools capable of being equipped with a variety of accessory tools and attachments, such as cutting blades, sanding discs, grinding tools, and many others. These types of tools typically include a generally cylindrically-shaped main body that serves as an enclosure for an electric motor as well as a hand grip for the tool. The electric motor drives an output shaft to rotate at high speeds. The output shaft is equipped with an accessory attachment system that enables accessory tools to be releasably secured to the power tool. In some rotary tools, a cutting wheel or disk is used as the accessory tool to cut or machine a workpiece, which may include a rod, a screw, a sheet of material, a pipe, and the like.

One issue with conventional rotary tools is the potential for the rotary tool to bind, or catch, in the workpiece. When the tool binds, the blade stops while the motor continues operating. The continued operation of the motor causes the tool to quickly rotate in the opposite direction of the tool rotation, potentially jerking away from the workpiece being cut. This can lead to a dangerous situation in which the user loses control of the tool, potentially contacting undesired objects with the cutting disk. It would be desirable therefore to provide a mechanism to limit rotation of the rotary tool when the tool binds in the workpiece.

Another common use of rotary tools using a cutting disk is to form a slot in a screw head. However, it is difficult to accurately form a slot centered in a screw head since the tool has a tendency to slide along the surface of the screw head before the cut begins. Thus, it would be desirable to provide a mechanism that facilitates accurate alignment of the rotary tool for slotting a screw head.

Additionally, when using a rotary tool with a cutting disk, the material removed from the workpiece is ejected from the cutting disk, potentially causing sparks and debris to land on a user or in other undesirable locations. It would therefore be desirable to provide a mechanism to reduce the amount of debris ejected from the immediate area of the cutting disk.

SUMMARY

In one embodiment, a guide attachment for a rotary power tool includes a body and an outer guard. The body defines a central opening configured to receive a shank of the rotary power tool, and the central opening defines a central axis. The outer guard extends circumferentially around at least a portion of the body. The outer guard and the body define a disk receiving recess adapted to receive at least a portion of a cutting disk of the rotary power tool. The outer guard further defines a first aperture that extends through the outer guard in a first direction that is generally orthogonal to the central axis.

In another embodiment, the guide attachment includes an attachment end portion connected to the body and configured to attach to the rotary power tool. In some embodiments, the central opening extends through the attachment end portion, and the attachment end portion includes a threaded region in the opening configured to attach to the rotary power tool.

In further embodiments, the guide attachment further comprises an intermediate portion interposed between the attachment end portion and the body portion, and the central opening extends through the intermediate portion to the attachment end portion. In addition, the intermediate portion defines an axial slot, and the guide attachment further comprises a sliding member extending through the slot from the central opening and configured to engage a release mechanism on the shank.

In another embodiment of the guide attachment, the first aperture has a diameter in a range of between approximately 0.279 inches and approximately 0.507 inches.

In yet another embodiment of the guide attachment, the body includes a base portion extending outwardly from the central opening to the outer guard, and the base portion and the outer guard define the disk receiving recess.

In some embodiments, the body defines a guide slot extending circumferentially around the body and the guide slot includes an open end at a first distance from the central axis and a closed end at a second distance from the central axis, the first distance being greater than the second distance.

In further embodiments, an opening is defined in the outer guard at the open end of the guide slot such that the open end of the guide slot is open to an exterior of the outer guard.

In one embodiment, the base portion includes an abutment at the open end of the slot. The abutment is positioned offset from a circumferential side of the opening in the outer guard that is remote from the closed end of the guide slot.

In another embodiment of the guide attachment, the outer guard includes a projection extending circumferentially from the abutment to the opening in the outer guard.

In yet another embodiment, the outer guard includes a support rib extending radially outwardly from the outer guard adjacent to the guide slot.

In some embodiments of the guide attachment, an outer surface of the outer guard surrounding the first aperture is planar.

In one particular embodiment of the guide attachment, the outer guard defines a second aperture that extends through the outer guard in a second direction generally orthogonal to the central axis. The first aperture has a first diameter and the second aperture has a second diameter, the first diameter being different from the second diameter. In further embodiments, the outer guard defines a third aperture that extends through the outer guard in a third direction generally orthogonal to the central axis, and the outer guard defines a fourth aperture that extends through the outer guard in a fourth direction generally orthogonal to the central axis. The third aperture has a third diameter and the fourth aperture has a fourth diameter, the first, second, third, and fourth diameters each being different from one another.

In another embodiment of the guide attachment, the outer guard and the body jointly define a planar surface configured to be supported on a workpiece.

Some embodiments of the guide attachment include a projection extending substantially perpendicular to the planar surface, the projection including an arcuate surface.

Additionally, some embodiments of the guide attachment further comprises a support member attached to the outer guard and spaced apart from the planar surface on a side of the planar surface remote from the central axis, the support member extending substantially parallel to the planar surface.

In another embodiment according to the disclosure, a rotary power tool system includes a motor configured to rotate an output shaft, an accessory tool including a shank operatively connected and rotationally fixed to the output shaft and a cutting disk operatively connected and rotationally fixed to the shank, the cutting disk defining a cutting disk plane. The rotary power tool system further comprises a guide including a body defining a central opening surrounding a first portion of the shank and an outer guard extending circumferentially around at least a second portion of the body. The outer guard and the body define a disk receiving recess in which at least a third portion of the cutting disk is received. The outer guard further defines a first aperture that extends through the outer guard in a first direction generally orthogonal to the central axis and which is centered in the cutting disk plane.

In yet another embodiment according to the disclosure, a guide attachment for a rotary power tool, comprises a body defining a central opening configured to receive a shank of the rotary power tool, the central opening defining a central axis, and a base portion defining a guide slot extending circumferentially around the body and which includes an open end at a first distance from the central axis and a closed end at a second distance from the central axis, the first distance being greater than the second distance.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

As used herein, the term "approximately" is defined to refer to values within five percent less than or greater than the given value or, for angles, angles that are within ten degrees of the given angle. As used herein, the term "substantially parallel" is defined to mean that the given object is located in a plane that is within at most 10 degrees offset from being parallel to the reference plane. As used herein, the term "substantially perpendicular" is defined to mean that the given object is located in a plane that is at most 10 degrees offset from perpendicular to the reference plane. As used here, the term "generally orthogonal" is defined to mean that the given object extends in a direction that is within at most 10 degrees from being orthogonal to the reference axis and passes within at most 5 millimeters from the reference axis.

Figure 1:
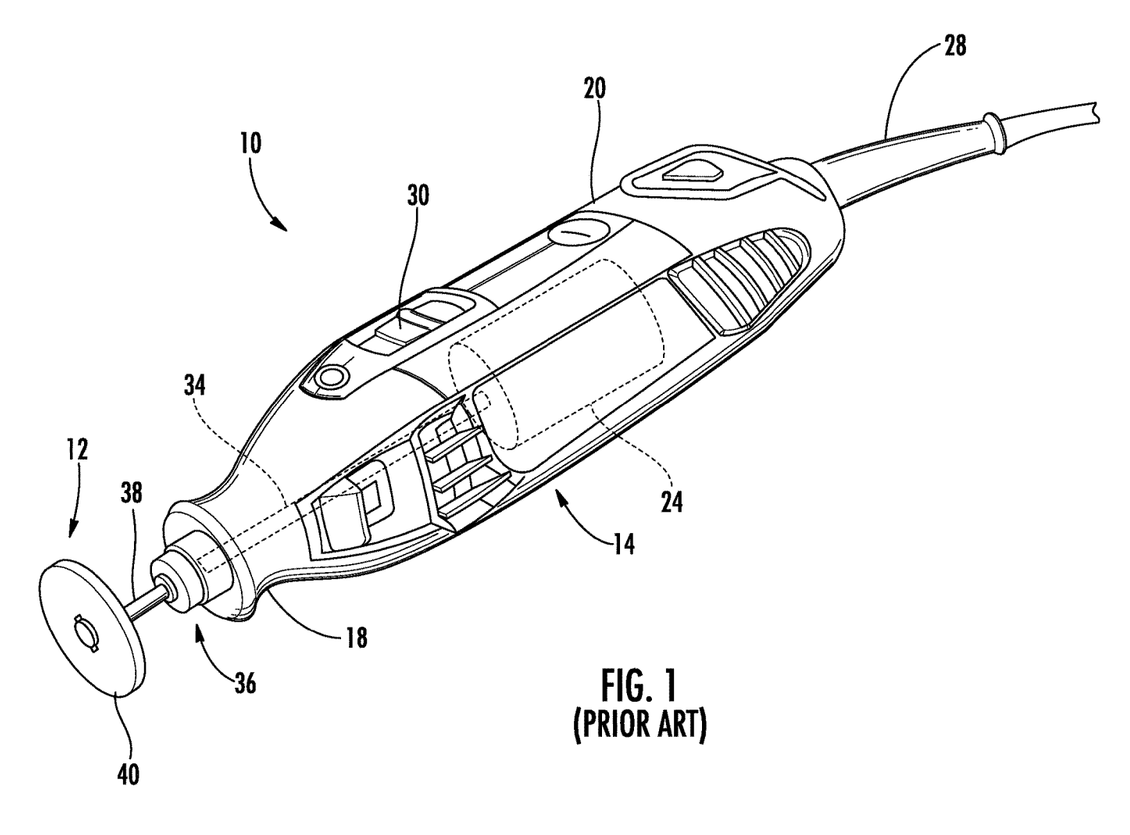
FIG. 1 is a side perspective view of a conventional hand held rotary tool.

Referring now to FIG. 1, a conventional rotary tool 10 includes a generally cylindrically shaped housing 14 constructed of a rigid material such as plastic, metal, or composite materials such as a fiber reinforced polymer. The housing 14 includes a nose portion 18 and a main body portion 20. The main body portion 20 serves as the handle for the tool 10 and encloses a motor 24. In one embodiment, the motor 24 comprises an electric motor configured to receive mains power from an AC outlet (not shown) via a power cord 28. Alternatively, electric power for the motor 24 may be received from a rechargeable battery (not shown) connected at the base of the main body portion 20. As an alternative to electric power, the rotary tool 10 may be pneumatically or hydraulically powered. Power to the motor is controlled by a power switch 30 provided on the handle portion 20 of the housing 14.

The motor 24 has an output shaft 34 that is configured to be rotated by the motor 24 about a motor axis. A tool holder 36 is coupled, either directly or via a transmission gear assembly (not shown), to the output shaft 34 so as to rotate with the output shaft 34. The tool holder is configured to releasably retain any one of a plurality of different accessory tools, or tool bits, to the output shaft 34 of the rotary tool 10, for example accessory tool 12, which includes a spindle 38 and a working portion. The spindle 38 is generally cylindrical and has a predetermined diameter at the end that attaches to the tool holder 36, such as, for example, one quarter (¼) of an inch, three sixteenths (3/16) of an inch, one eighth (⅛) of an inch, four to six (4-6) millimeters and/or the like. The working portion has a configuration adapted to perform a specific type of task or tasks, such as, for example, milling, drilling, cutting, grinding, and the like. In the illustrated embodiment, the working portion is a cutting disk 40.

Figure 2:
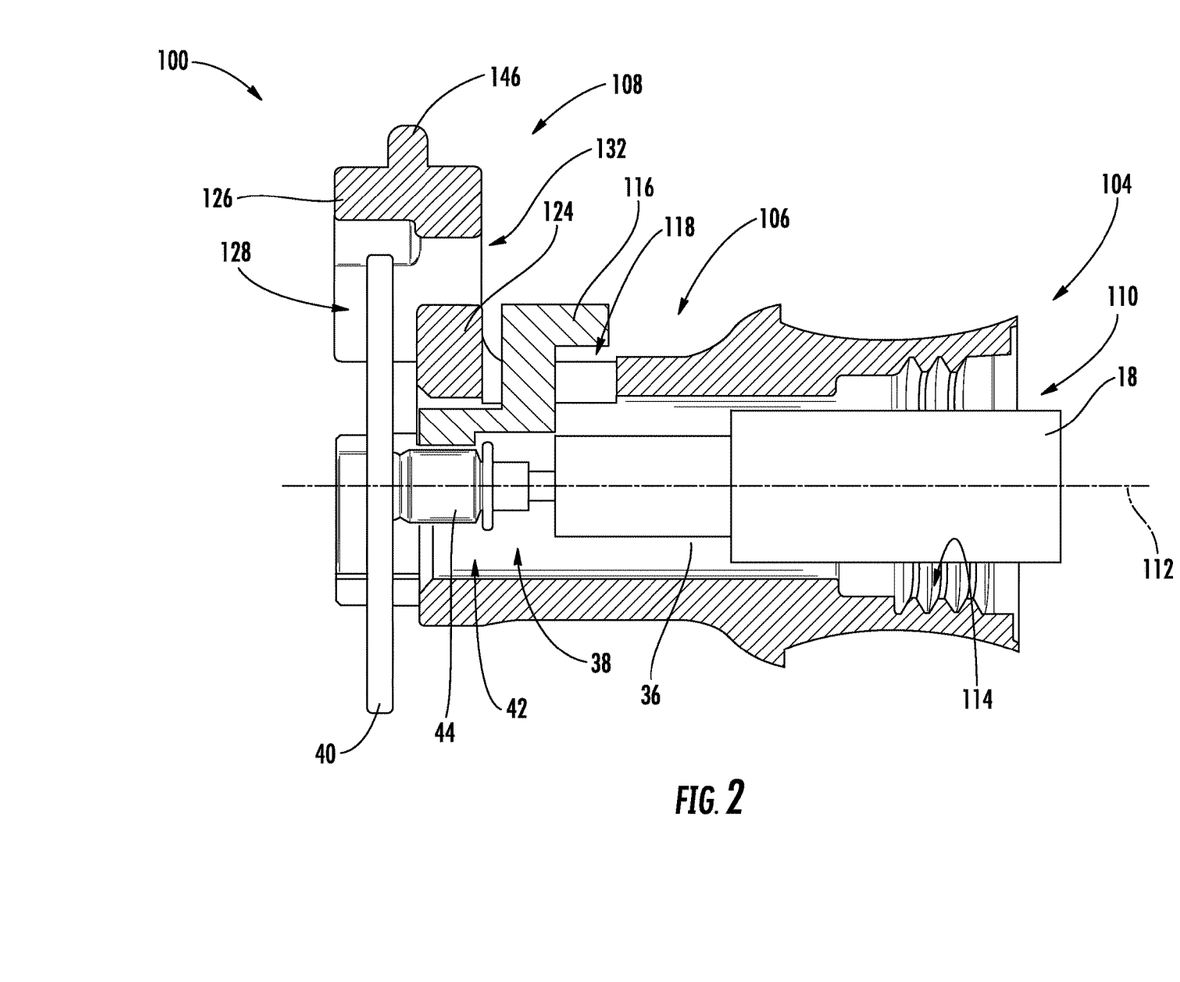
FIG. 2 is a side cross-sectional view of a guide attachment according to the disclosure attached to the rotary tool of FIG. 1.

As illustrated in FIG. 2, in some embodiments, the spindle 38 is configured as a mandrel 42 having a quick release mechanism 44. The quick release mechanism 44 is configured to release the cutting disk 40 when the quick release mechanism 44 is moved in a direction toward the nose portion 18 of the rotary tool 10 (e.g. to the right in the view of FIG. 2). The quick release mechanism 44 therefore enables changing the working portion of the accessory tool 12 without removing the mandrel 42 from the tool holder 36.

Referring now to FIGS. 2-6, a guide attachment 100 is illustrated for use with a rotary tool, for example the rotary tool 10 illustrated in FIG. 1. The guide attachment 100 includes an attachment end portion 104, an intermediate portion 106, a guide body 108, and a central opening 110 defined along a central axis 112 of the guide attachment 100. The attachment end portion 104 includes a plurality of screw threads 114 configured to mate with a threaded portion (not shown) of the nose portion 18 of the rotary tool 10. In some other embodiments, however, the attachment end 104 is configured to clamp to the nose portion 18 of the rotary tool 10, includes a separate nut that mates with screw threads of the nose portion 18, or is configured to attach to the nose portion 18 of the rotary tool 10 in another suitable manner.

The intermediate portion 106 connects the attachment end portion 104 to the guide body portion 108. The intermediate portion 106 includes a sliding member 116, which projects through an axial slot 118 defined in the intermediate portion 106 and engages the quick release mechanism 44 of the mandrel 42. The sliding member 116 enables the user to actuate the quick release mechanism 44 by sliding the sliding member 116, and thereby the quick release mechanism 44, to the right in the view of FIG. 2 to release the cutting disk 40 without removing the guide accessory 100 from the rotary tool 10.

Figure 3:
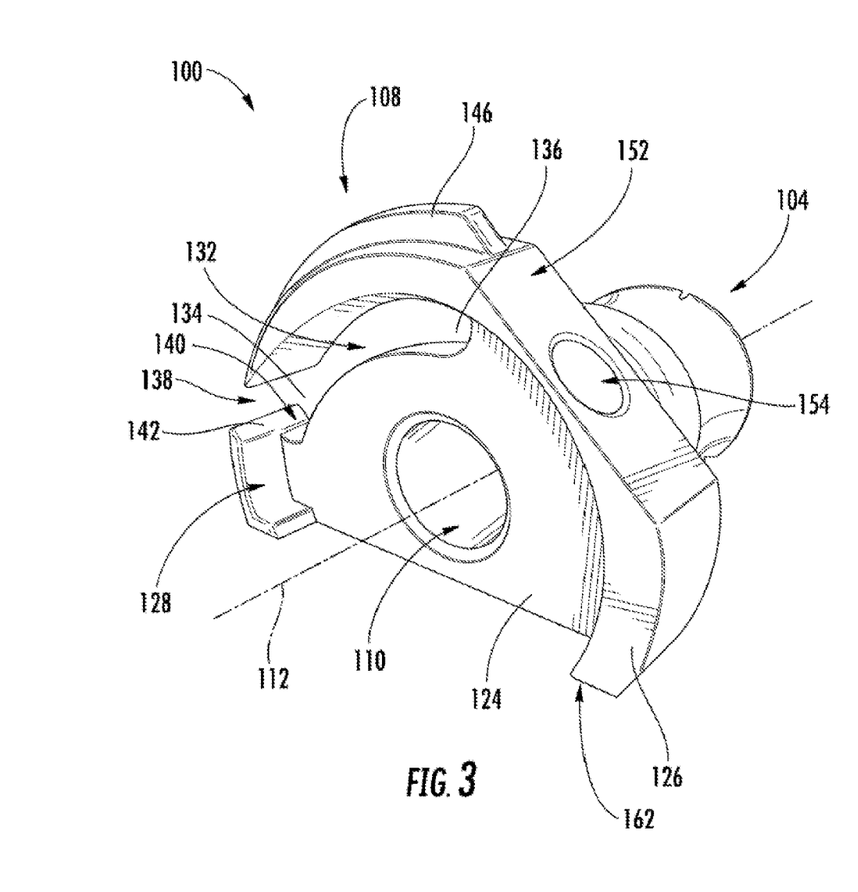
FIG. 3 is a side perspective view of the guide attachment of FIG. 2
Figure 4:
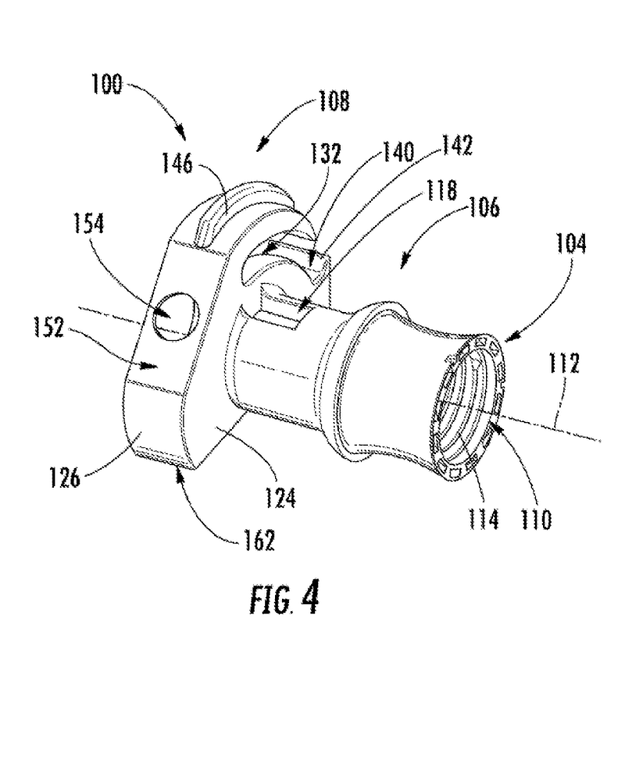
FIG. 4 is a rear perspective view of the guide attachment of FIG. 2.
Figure 5:
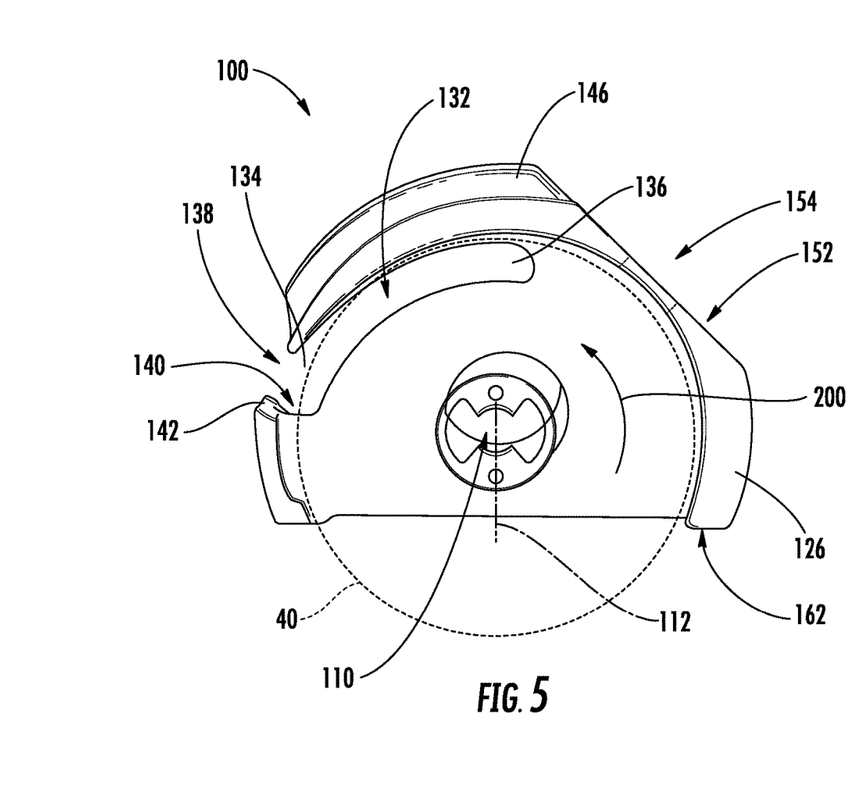
FIG. 5 is a front view of the guide attachment of FIG. 2.
Figure 6:
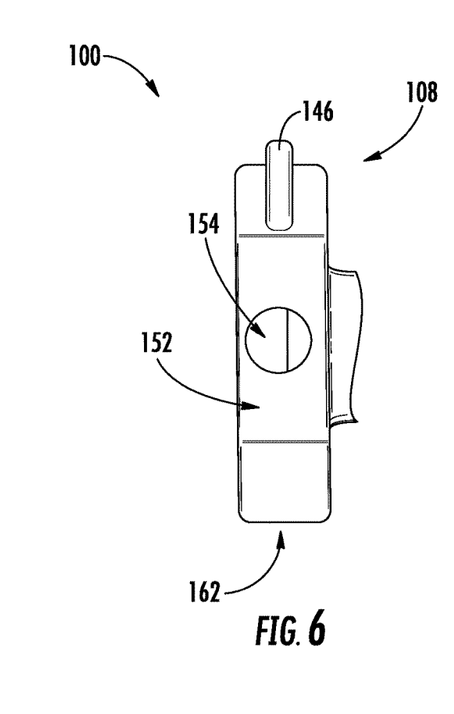
FIG. 6 is a side view of the guide attachment of FIG. 2.

With particular reference now to FIGS. 3 and 4, and continued reference to FIGS. 2, 5, and 6, the guide body 108 includes a base portion 124 extending radially outwardly from the central opening 110 to an outer guard 126, which extends axially outwardly from the outer edge of the base portion 124 around a portion of the circumference of the base portion 124 away from the direction of the rotary tool 10. In the illustrated embodiment, the outer guard 126 forms an arc of approximately 135 degrees around the central axis 112, though in other embodiments the outer guard 126 forms an arc that is greater than or less than 135 degrees. As illustrated in FIG. 2, the base portion 124 and the outer guard 126 define a cutting disk receiving recess 128 configured to receive the cutting disk 40 of the accessory tool 12.

Referring now to FIGS. 3-5, the base portion 124 includes a guide slot 132 extending circumferentially around a radially outer region of the base portion 124. The guide slot 132 is configured such that the distance from the guide slot 132 to the central axis 112 decreases approximately uniformly from the open end 134 toward the closed end 136 of the guide slot 132. At the open end 134 of the guide slot 132, the outer guard 126 defines an opening 138 through which the guide slot 132 is open to the exterior of the outer guard 126.

At the open end 134 of the guide slot 132, an abutment 140 is formed on the base portion 124 adjacent to a circumferentially extending projection 142 on the outer guard 126. As discussed in detail below, the abutment 140 and projection 142 enables the user to maintain control of the rotary tool 10 even in the event that the cutting disk 40 binds while cutting a rod in the guide slot 132.

The outer guard 126 also includes a support rib 146 extending radially outwardly around the portion of the outer circumference of the outer guard 126 adjacent to the guide slot 132. The support rib 146 structurally supports the portion of the outer guard 126 since the guide slot 132 prevents the base portion 124 from directly attaching to the outer guard 126 in the region of the guide slot 132.

In the illustrated embodiment, the guide slot 132 extends approximately 90 degrees around the circumference of the base portion 124. In other embodiments, however, the guide slot extends between approximately 80 and approximately 100 degrees around the circumference of the base portion 124, while in further embodiments, the guide slot extends between approximately 60 and approximately 120 degrees around the circumference of the base portion 124. The guide slot 132 has a width measured in the radial direction that is adapted to the maximum size of rod or shaft desired to be cut in the guide slot 132. In one embodiment, the width of the guide slot 132 in the radial direction is approximately one quarter inch.

With continued reference to FIGS. 2-6, and particular reference to FIGS. 3-5, the exterior surface of the outer guard 126 includes a flattened portion 152 in which a guide aperture 154 is defined through the outer guard 126. The guide aperture 154 is circular or generally circular and is sized to receive a head of a screw with minimum clearance so as to retain the screw head in place while the cutting disk 40 forms a slot in the screw head. In one embodiment, the guide aperture 154 has a diameter of between approximately 0.171 inches to approximately 0.762 inches. In another embodiment, the guide aperture 154 has a diameter of between approximately 0.279 inches and approximately 0.507 inches.

As illustrated, in particular, in FIGS. 3, 5, and 6, at the bottom of the guide body portion 108, both the base portion 124 and the outer guard 126 form a flat bottom surface 162. The flat bottom surface 162 is formed in a single plane so that the guide attachment 100 can be rested on a surface of a workpiece while the workpiece is being machined. The plane of the flat bottom surface is generally parallel to the central axis 112 of the guide attachment 100.

The guide attachment 100 of the embodiment of FIGS. 2-6 provides three beneficial functions. The guide slot 132 enables a rod, for example a screw, a nail, a rivet, a hex wrench, etc., to be guided along the cutting disk 40 for a controlled cut of the rod. The guide aperture 154 enables a screw head to be retained in place while the cutting disk 40 is used to form a slot the head of the screw. The flat bottom surface 162 forms a guide surface, against which the guide body portion 108 of the guide attachment 100 is rested during cuts of longer materials, for example sheet materials.

Figure 7:
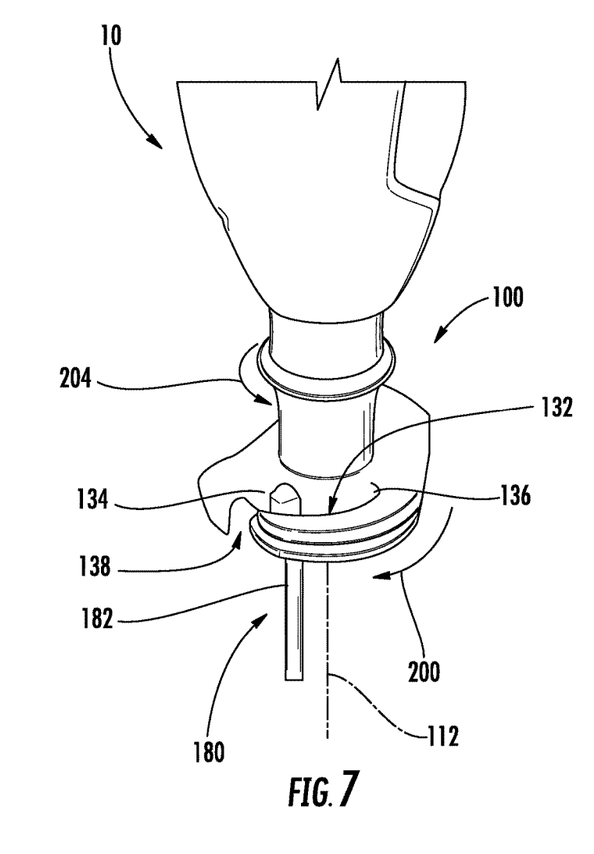
FIG. 7 is a side perspective view of the guide attachment of FIG. 2 in use to cut a shaft of a fastener.

Referring now to FIG. 7, and with continuing reference to FIGS. 2-6, to use the guide slot 132, the user positions the rotary tool 10 such that the opening 138 in the outer guard 126 is aligned with the rod to be cut, which, in the illustration of FIG. 7, is a shaft 182 of screw 180. The user then activates the power switch 30, connecting the motor 24 to the power source and activating the motor 24, which rotates the output shaft 34 and the cutting disk 40 of the accessory tool 12 in direction 200. The user guides the rotary tool 10 such that shaft 182 moves into the open end 134 of the slot 132, at which point the cutting disk 40 begins machining the shaft 182 of the screw 180. The user then rotates the rotary tool 10 about the central axis 112. As the user rotates the rotary tool 10, the closed end 136 of the guide slot 132 moves toward the shaft 182 of the screw 180 and the guide slot 132 guides the guide attachment 100 such that the cutting disk 40 advances through the shaft 182 of the screw 180 in a controlled manner. Once the closed end 136 of the guide slot 132 reaches the screw shaft 182, the cutting disk 40 has passed completely through the screw shaft 182.

Since the cutting disk 40 is advanced through the screw shaft 182 as a function of the user rotation of the rotary tool 10, the cutting disk 40 generally advances at a controlled rate. As a result, the amount of the screw machined at any given time is controlled, and the cutting disk 40 is therefore less likely to bind in the shaft 182. Accordingly, the guide slot 132 advantageously reduces the tendency of the cutting disk 40 to bind, or stop, in the screw shaft 182.

Additionally, the guide slot 132 also keeps the rotary tool 10 from being propelled away from the screw in the event the cutting disk 40 binds while cutting the shaft, thereby helping the user maintain control of the rotary tool 10. If the cutting disk 40 becomes stuck on the shaft 182 of the screw 180, the rotary tool 10 and the guide attachment 100 rotate in the direction 204 due to the motor 24 continuing to operate while the cutting disk 40 is stopped. As the guide attachment 100 rotates in direction 204, the guide slot 132 rotates until the abutment surface 140 (FIG. 5) contacts the shaft 182 of the screw 180, absorbing the inertia of the rotary tool 10 and stopping the rotational movement of the rotary tool 10. In this way, the guide slot 132 limits the rotation resulting from the reaction forces when the cutting disk 40 binds in the shaft 182, thereby helping the user to maintain control of the rotary tool 10.

Figure 8:
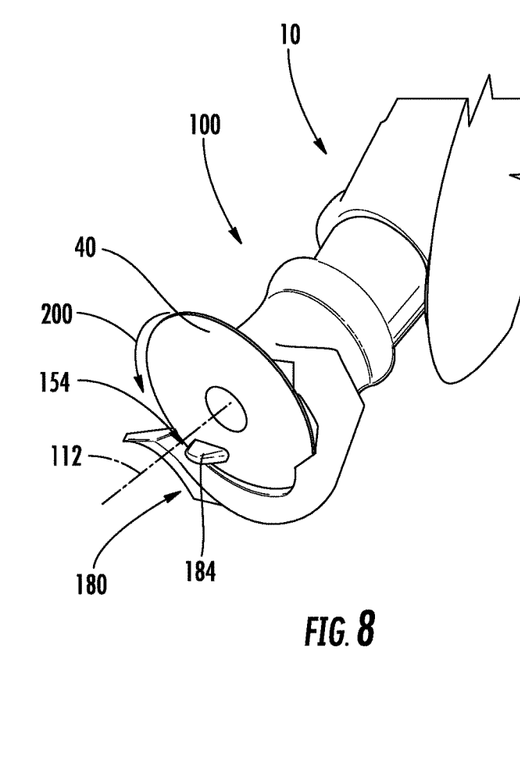
FIG. 8 is a front perspective view of the guide attachment of FIG. 2 in use to slot a fastener.

FIG. 8 illustrates the guide attachment 100 in use to form a slot in a head 184 of a screw 180. The user first aligns the head 184 of the screw 180 in the guide aperture 154. Then, the user activates the motor using the power switch 30 to begin rotating the cutting disk 40 in direction 200. The user then moves the rotary tool 10 so that the cutting disk 40 moves into contact with the screw head 184 to begin machining a slot in the screw head 184. Since the guide aperture 154 centers the screw head 184 relative to the cutting disk 40 and retains the screw head 184 in place, a controlled and accurately positioned slot is formed in the screw head 184.

In order to cut a sheet or strip workpiece having relatively low thickness compared to the size of the cutting disk 40, the user places the flat bottom surface 162 against the upper surface of the workpiece and actuates the power switch 30 to activate the motor 24. The user then guides the rotary tool 10 such that the flat bottom surface 162 of the guide attachment 100 remains abutted against the surface of the workpiece. The cutting disk 40 machines the workpiece, forming an accurate and guided cut through the workpiece due to the guiding of the guide attachment 100 against the workpiece.

In the illustrated embodiment, the guide attachment 100 is shown in use with a rotary tool 10 in which the motor is parallel to and coaxial with the rotational axis of the cutting disk 40 and the central axis 112 of the guide attachment 100. The reader should appreciate, however, that the guide attachment 100 may be used with a rotary tool in which the motor is perpendicular to the rotational axis of the cutting disk. In some embodiments, the features of the guide attachment 100, for example one or more of the guide slot 132, the guide aperture 154, and/or the flat bottom surface 162, are integrated into a fixed guard in the parallel motor or perpendicular motor rotary tool.

In the illustrated embodiment, the guide attachment 100 includes all three of the guide slot 132, the guide aperture 154, and the flat bottom surface 162. In other embodiments, however, the guide attachment may include only one or two of the above features. For example, in one embodiment, the guide attachment only includes a guide aperture 154. In another embodiment, the guide attachment only includes a guide slot 132. In yet another embodiment, the guide attachment includes a guide aperture 154 and a guide slot 132, but does not include the flat bottom surface feature.

Figure 9:
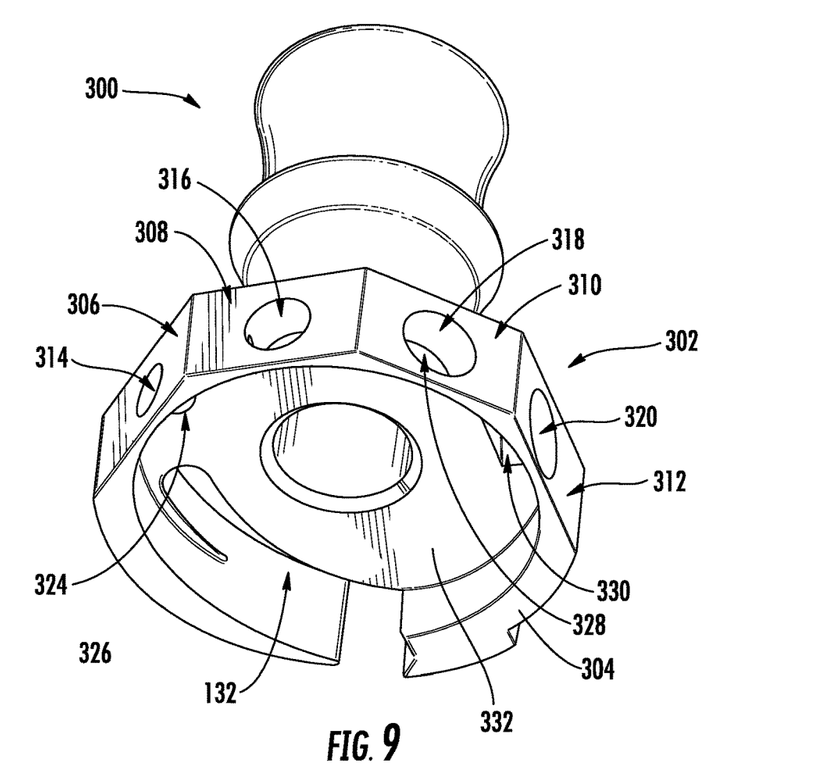
FIG. 9 is front a perspective view of another embodiment of a guide attachment according to the disclosure having a plurality of circular holes for slotting.

In various embodiments, a guide attachment may include more than one guide aperture to enable the guide attachment to be used to form slots in screw heads of differing sizes. For example, FIG. 9 illustrates another embodiment of a guide attachment 300 in which the guide body portion 302 has an outer guard 304, which includes four flattened regions 306, 308, 310, 312, each of which includes a respective guide aperture 314, 316, 318, 320. Each of the guide apertures 314, 316, 318, 320 is sized differently from the other guide apertures 314, 316, 318, 320. For example, in the illustrated embodiment, the first guide aperture 314 is smaller than the second guide aperture 316, which is smaller than the third guide aperture 318, which is in turn smaller than the fourth guide aperture 320. In one particular embodiment, the first guide aperture 314 has a diameter of approximately 0.279 inches, the second guide aperture has a diameter of approximately 0.332 inches, the third guide aperture has a diameter of approximately 0.385 inches, and the fourth guide aperture 320 has a diameter of approximately 0.507 inches.

In addition, the embodiment of FIG. 9 illustrates that each of the guide apertures 314, 316, 318, 320 is adjacent a depression 324, 326, 328, 330 defined recessed into the base portion 332 of the guide body 302. The depressions 324, 326, 328, 330 have the same diameter as the corresponding guide aperture 314, 316, 318, 320 and enable the screw head 184 to be positioned at a position in which a slot of desired depth can be formed in the screw head 184. The reader should appreciate that, while not illustrated in the embodiment of FIGS. 2-6, the guide attachment 100 may also include depressions defined recessed into the base portion similar to those illustrated in FIG. 9.

The guide attachment 300 of the embodiment of FIG. 9 is used in a manner similar to the embodiment of FIGS. 2-6 discussed above. The user selects the appropriate guide aperture 314, 316, 318, 320 sized for the screw head to be slotted and positions the rotary tool 10 such that the selected guide aperture 314, 316, 318, 320 surrounds the screw head 184 with minimal clearance. The user then activates the motor 24 by actuating the power switch 30, rotating the cutting disk 40. The user moves the rotary tool 10 such that the cutting disk 40 forms a slot in the screw head 184, with the selected guide aperture 314, 316, 318, 320 guiding the guide attachment 300 and cutting disk 40 to form a controlled slot in the screw head 184.

Figure 10:
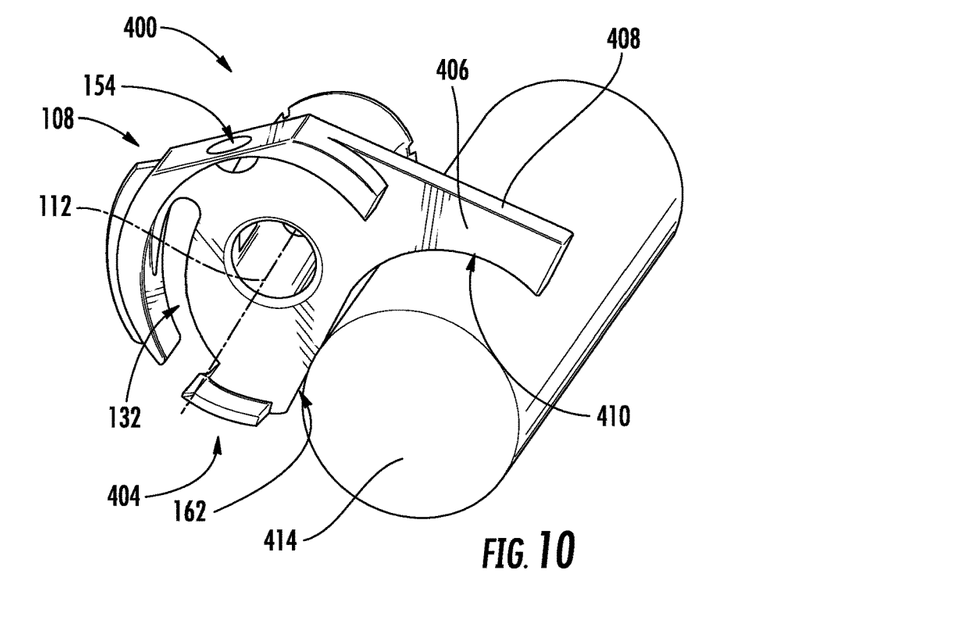
FIG. 10 is front a perspective view of yet another embodiment of a guide attachment according to the disclosure having a stabilizing projection.

FIG. 10 illustrates another embodiment of a guide attachment 400 for a rotary tool such as the rotary tool 10 of FIG. 1. The guide attachment 400 is similar to the guide attachment 100 of the embodiment of FIGS. 2-6, with the exception that the guide body 404 includes a projection 406 extending in a direction generally away from the central axis 112 and the flat bottom surface 162 of the guide attachment 400. The projection 406 has one side 408 that is substantially flat and is oriented substantially perpendicular to the flat bottom surface 162, and an opposite arcuate side 410 that merges into the flat bottom surface 162. The arcuate side 410 has a diameter that is approximately equal to a diameter of a pipe 414, conduit, rod, or shaft that is desired to be cut. In one embodiment, the arcuate side 410 has a diameter of approximately 1.5 inches, though in other embodiments the arcuate side has another suitable diameter.

To use the guide attachment 400 to cut a pipe 414, the user positions the rotary tool 10 with the guide attachment 400 adjacent the pipe 414 and actuates the power switch 30 to activate the motor 24 and spin the cutting disk 40. The user then begins to move the cutting disk 40 toward the pipe 414 and to a position in which the pipe 414 contacts the arcuate side 410 of the projection 406. Once the pipe 414 abuts the arcuate side 410 of the projection 406, the user moves the rotary tool 10 around the pipe 414, or rotates the pipe 414 relative to the arcuate side 410, while retaining the arcuate side 410 and the pipe 414 in contact with one another. In this way the cutting disk 40 machines through the pipe 414 in a guided and controlled manner until the entire circumference of the pipe 414 has been cut.

Figure 11:
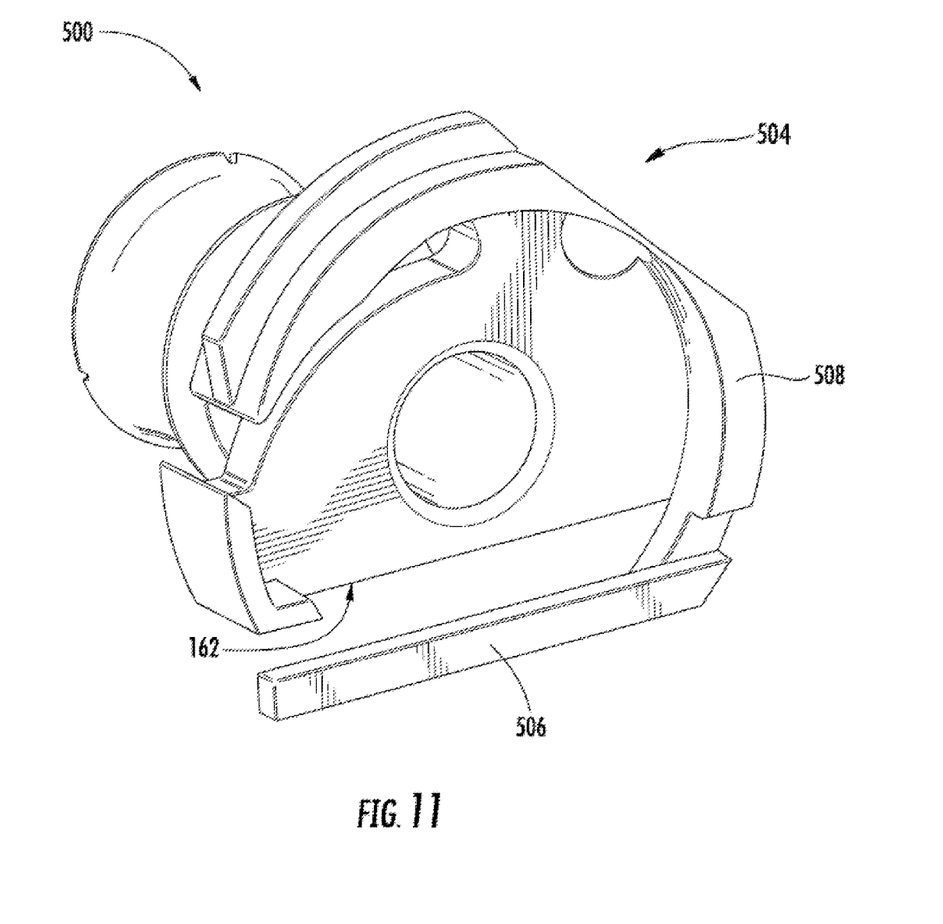
FIG. 11 is front a perspective view of another embodiment of a guide attachment according to the disclosure having a lower guide portion.

FIG. 11 illustrates yet another embodiment of a guide attachment for a rotary tool such as the rotary tool 10 of FIG. 1. The guide attachment 500 is similar to the guide attachment 100 of the embodiment of FIGS. 2-6, with the exception that the guide body 504 includes a support member 506 projecting from the outer guard 508 in a direction substantially parallel to the flat bottom surface 162. The support member 506 provides structural support for cutting flexible, pliable, thin, or nonrigid substrates. The guide attachment 500 is used in a similar manner as the embodiment of FIGS.

2-6 by abutting the flat bottom surface 162 to the workpiece and actuating the power switch to spin the cutting disk 40. The user then moves the rotary tool 10 such that the flat bottom surface 162 moves along the surface of the workpiece, cutting through the workpiece. As the cutting disk 40 moves through the workpiece, the cut portion of the workpiece may sag from the uncut portion. The support member 506 retains the cut portion of the workpiece adjacent to the uncut portion, avoiding excessive sagging of the cut portion of the workpiece, which can reduce the quality of the cut.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A guide attachment for a rotary power tool, comprising:
   a body defining a central opening configured to receive a shank of the rotary power tool, the central opening defining a central axis; and
   an outer guard extending circumferentially around at least a portion of the body, the outer guard and the body defining a disk receiving recess adapted to receive at least a portion of a cutting disk of the rotary power tool, the outer guard further defining a first aperture that extends through the outer guard in a first direction, said first aperture having a first aperture central axis that is generally orthogonal to the central axis of the central opening, said first aperture being configured to receive a screw head so as to enable the screw head to be machined by the cutting disk.

2. The guide attachment of claim 1, further comprising an attachment end portion connected to the body and configured to attach to the rotary power tool.

3. The guide attachment of claim 2, wherein the central opening extends through the attachment end portion, and the attachment end portion includes a threaded region in the central opening configured to attach to the rotary power tool.

4. The guide attachment of claim 2, further comprising an intermediate portion interposed between the attachment end portion and the body, wherein:
   the central opening extends through the intermediate portion to the attachment end portion,
   the intermediate portion defines an axial slot, and
   the guide attachment further comprises a sliding member extending through the axial slot from the central opening and configured to engage a release mechanism on the shank of the rotary power tool.

5. The guide attachment of claim 1, wherein the first aperture has a diameter in a range of between approximately 0.279 inches and approximately 0.507 inches.

6. The guide attachment of claim 1, wherein the body includes a base portion extending outwardly from the central opening to the outer guard, the base portion and the outer guard defining the disk receiving recess.

7. The guide attachment of claim 6, wherein the body defines a guide slot extending circumferentially around the base portion, the guide slot including an open end at a first distance from the central axis of the central opening and a closed end at a second distance from the central axis of the central opening, the first distance being greater than the second distance.

8. The guide attachment of claim 7, wherein an opening is defined in the outer guard at the open end of the guide slot such that the open end of the guide slot is open to an exterior of the outer guard.

9. The guide attachment of claim 8, wherein the base portion includes an abutment at the open end of the guide slot, the abutment being positioned offset from a circumferential side of the opening in the outer guard that is remote from the closed end of the guide slot.

10. The guide attachment of claim 9, wherein the outer guard includes a projection extending circumferentially from the abutment to the opening in the outer guard.

11. The guide attachment of claim 7, wherein the outer guard includes a support rib extending radially outwardly from the outer guard adjacent to the guide slot.

12. The guide attachment of claim 1, wherein an outer surface of the outer guard surrounding the first aperture is planar.

13. The guide attachment of claim 1, wherein:
   the outer guard defines a second aperture that extends through the outer guard in a second direction generally orthogonal to the central axis of the central opening, and
   the first aperture has a first diameter and the second aperture has a second diameter, the first diameter being different from the second diameter.

14. The guide attachment of claim 13, wherein:
   the outer guard defines a third aperture that extends through the outer guard in a third direction generally orthogonal to the central axis of the central opening,
   the outer guard defines a fourth aperture that extends through the outer guard in a fourth direction generally orthogonal to the central axis of the central opening, and
   the third aperture has a third diameter and the fourth aperture has a fourth diameter, the first, second, third, and fourth diameters each being different from one another.

15. The guide attachment of claim 1, wherein the outer guard and the body jointly define a planar surface configured to be supported on a workpiece.

16. The guide attachment of claim 15, further comprising a projection extending substantially perpendicular to the planar surface, the projection including an arcuate surface.

17. The guide attachment of claim 15, further comprising a support member attached to the outer guard and spaced apart from the planar surface on a side of the planar surface remote from the central axis of the central opening, the support member extending substantially parallel to the planar surface.

18. A rotary power tool system, comprising:
   a motor configured to rotate an output shaft;
   an accessory tool including a shank operatively connected and rotationally fixed to the output shaft and a cutting disk operatively connected and rotationally fixed to the shank, the cutting disk defining a cutting disk plane; and
   a guide comprising:
      a body defining a central opening surrounding a first portion of the shank, the central opening defining a central axis; and
      an outer guard extending circumferentially around at least a second portion of the body, the outer guard and the body defining a disk receiving recess in which at least a third portion of the cutting disk is received, the outer guard further defining a first aperture that extends through the outer guard in a first direction, said first aperture having a first aperture central axis that is generally orthogonal to the central axis of the central opening and which is centered in the cutting disk plane, said first aperture being configured to receive a screw head so as to enable the screw head to be machined by the cutting disk.

19. A guide attachment for a rotary power tool, comprising:
- a body defining a central opening configured to receive a shank of the rotary power tool, the central opening defining a central axis; and
- a base portion defining a guide slot extending circumferentially around the base portion, the guide slot including an open end at a first distance from the central axis and a closed end at a second distance from the central axis, the first distance being greater than the second distance,
- wherein the base portion includes an abutment that forms a circumferential stop of the guide slot at the open end.

20. The guide attachment of claim 19, wherein the guide slot is arcuately shaped such that a distance between the guide slot and the central axis decreases approximately uniformly from the open end to the closed end.

* * * * *